United States Patent [19]
Wu et al.

[11] Patent Number: 6,105,130
[45] Date of Patent: Aug. 15, 2000

[54] METHOD FOR SELECTIVELY BOOTING FROM A DESIRED PERIPHERAL DEVICE

[75] Inventors: Gilbert Chang-Tying Wu, San Jose; Yen-Chung Lin, Saratoga, both of Calif.

[73] Assignee: Adaptec, Inc., Milpitas, Calif.

[21] Appl. No.: 09/016,764

[22] Filed: Jan. 30, 1998

Related U.S. Application Data

[60] Provisional application No. 60/068,621, Dec. 23, 1997.
[51] Int. Cl.[7] ............................................. G06F 9/445
[52] U.S. Cl. ......................................................... 713/2
[58] Field of Search ............................................ 713/1, 2

[56] References Cited

U.S. PATENT DOCUMENTS

| | | | |
|---|---|---|---|
| 5,418,918 | 5/1995 | Vander Kamp et al. | 713/2 |
| 5,694,600 | 12/1997 | Khenson et al. | 713/2 |

OTHER PUBLICATIONS

Unknown, "*BIOS Boot Specification*", Version 1.01, Compaq Computer Corp., Intel Corporation, Phoenix Technologies, Ltd., Jan. 11, 1996.

Unknown, "*ASUS P2L97 Penitum II Motherboard*" User's Manual, Rev. 1.05, Sep. 1997, ASUSTeK Computer, Inc.

Unknown, "*ASUS P2L97-S Penitum II Motherboard*" User's Manual, Rev. 1.05, Sep. 1997, ASUSTeK Computer, Inc.

*Primary Examiner*—Thomas M. Heckler
*Attorney, Agent, or Firm*—Martine Penilla & Kim, LLP

[57] ABSTRACT

Disclosed is a method for booting a computer system. The computer system includes a first device and a second device which, during initialization of the computer system, are each respectively automatically associated with a unique identification used in a computer generated request to indicate whether the first device or the second device is to respond to the computer generated request. The method includes the act modifying each unique identification that is associated with the first device and the second device of the computer system. In this manner, the second device responds to the computer generated request for the first device, and the first device responds to the computer generated request for the second device.

26 Claims, 9 Drawing Sheets

| Initial Request | Passed Request | Responding Device |
|---|---|---|
| 80 | 80 | SCSI II |
| 81 | 80 | SCSI I |
| 82 | 80 | IDE |
| 83 | 81 | IDE |
| 84 | 83 | SCSI I |
| 85 | 84 | SCSI I |
| 86 | 86 | SCSI II |
| 87 | 87 | SCSI II |

FIGURE 5B

| SCSI II | Physical Device: | D | E | F |
|---|---|---|---|---|
| | Responsive to: | 80 | 86 | 87 |
| | Initial Request: | 80 | 86 | 87 |
| SCSI I | Physical Device: | A | B | C |
| | Responsive to: | 80 | 83 | 84 |
| | Initial Request: | 81 | 84 | 85 |
| IDE | Physical Device: | M | S | |
| | Responsive to: | 80 | 81 | |
| | Initial Request: | 82 | 83 | |

FIGURE 5C

| Initial Request | Passed Request | Responding Device |
|---|---|---|
| 80 | 80 | SCSI II |
| 81 | 81 | SCSI II |
| 82 | 82 | SCSI II |
| 83 | 80 | SCSI I |
| 84 | 81 | SCSI I |
| 85 | 82 | SCSI I |
| 86 | 80 | IDE |
| 87 | 81 | IDE |

FIGURE 6B

| SCSI II | Physical Device: | D | E | F |
|---|---|---|---|---|
| | Responsive to: | 80 | 81 | 82 |
| | Initial Request: | 80 | 81 | 82 |
| SCSI I | Physical Device: | A | B | C |
| | Responsive to: | 80 | 81 | 82 |
| | Initial Request: | 83 | 84 | 85 |
| IDE | Physical Device: | M | S | |
| | Responsive to: | 80 | 81 | |
| | Initial Request: | 86 | 87 | |

FIGURE 6C

METHOD FOR SELECTIVELY BOOTING FROM A DESIRED PERIPHERAL DEVICE

CROSS REFERENCE TO RELATED APPLICATIONS

This application claims the benefit of U.S. Provisional Patent Application having Serial No. 60/068,621, filed on Dec. 23, 1997, entitled "Method for Selectively Booting from a Desired Peripheral Device." This application is hereby incorporated by reference.

BACKGROUND OF THE INVENTION

1. Field of the Invention

This invention relates generally to computer systems and their associated peripheral devices, and more particularly to methods and apparatus for booting a computer system from a user defined peripheral device.

2. Description of the Related Art

Computer systems today typically have several connected peripheral devices. These devices include various drives which allow data to be written or read by the computer system to or from various media. For example, such devices include floppy drives, tape drives, hard drives, CD-ROMs, CD-R drives, scanners, and DVD drives among others. These devices generally communicate with a computer system through specific interface protocols, which most commonly include what are known as IDE protocols and SCSI protocols. Thus, peripheral manufactures will generally manufacture protocol specific devices, which are designated to be either an IDE device or a SCSI device, which may or may not have the same capabilities.

For example, the operation of an IDE device is typically slower than that of a SCSI device, and SCSI devices tend to have superior multi-tasking capabilities over IDE devices. Another drawback of an IDE device is that the IDE protocol only enables data transfers of fixed block sizes (i.e., 512 bytes per sector?), whereas SCSI devices are able to transfer data having variable block sizes. Although additional custom processing can be developed to improve the performance of IDE devices, this additional development has the disadvantage of adding a substantial amount of front-end effort as well as processing time. Further, SCSI connectors can typically accomodate connection of up to 7 or 15 devices to the computer, whereas IDE connectors typically can handle only two devices. These drawbacks therefore make IDE devices less attractive than their SCSI counterparts.

As is well known, the basic operation of a computer system includes booting its basic software algorithms to prepare the computer system for normal operation. Such booting is accomplished by reading and then executing commands of the basic software algorithms from a particular medium. Therefore, the booting operation will require identifying the device (which is connected to the computer system) that has the medium that is to be read. The identified device is commonly known as "the boot device."

Conventionally, booting operations of computer systems are pre-designed to search for IDE devices and then search for SCSI devices, identifying the first found IDE device as the boot device. Accordingly, if an IDE device is connected to the computer system, the system will automatically boot from the IDE device, whether or not the user prefers to boot from the IDE device. Even if the user prefers to boot from a higher performance SCSI device, the user's computer system will not allow the user to indicate a booting preference. As a result, there is currently no efficient mechanism available to enable a user to take advantage of many superior capabilities and performance of SCSI devices during a boot operation.

In view of the foregoing, there is a need for improved techniques for custom booting computer systems. In particular, there is a need for techniques that enable booting a computer system from a user selected SCSI device, even when an IDE device is connected to the computer system.

SUMMARY OF THE INVENTION

Broadly speaking, the present invention fills these needs by providing a method for selectively booting from a desired peripheral device. It should be appreciated that the present invention can be implemented in numerous ways, including as a process, an apparatus, a system, a device, a method, or a computer readable medium. Several inventive embodiments of the present invention are described below.

In one embodiment, a method for booting a computer system having a plurality of devices including an IDE device and a SCSI device is disclosed. The method includes the acts of initializing the computer system, so that the initializing causing an automatic identification of the IDE device as a boot device. The method further includes specifying the SCSI device to be the boot device so that the computer system boots from the SCSI device and not from the IDE device. In this embodiment, the specifying is in part a function of a user input.

In another embodiment, a method for booting a computer system that is connected to an IDE device and a SCSI device is disclosed. The method includes the acts of searching for the IDE device. The SCSI device is searched for after the searching for the IDE device has been performed. The SCSI device is also identified as a boot device, and then booting is performed from the identified SCSI device. The method further includes associating an identifier with the IDE device when the IDE device is found by the searching, such that the IDE device is identified as the boot device before searching for the SCSI device. In addition, the method includes requesting a read of a first sector of the boot device, such that the request identifies the boot device by using the identifier associated with the IDE device.

In yet another embodiment, a method for booting a computer system is disclosed. The computer system includes a first device and a second device which, during initialization of the computer system, are each respectively automatically associated with a unique identification used in a computer generated request to indicate whether the first device or the second device is to respond to the computer generated request. The method includes the act modifying each unique identification that is associated with the first device and the second device of the computer system. In this manner, the second device responds to the computer generated request for the first device, and the first device responds to the computer generated request for the second device.

Although the embodiments of the present invention have numerous advantages, the flexibility of selectively identifying a desired peripheral device from which to boot a computer system enables users to make use of superior capabilities that may be offered by a given peripheral device. Furthermore, the methods of the present invention make implementation of this selective booting user friendly without modifying standard existing system BIOS and computer operating systems. These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like elements.

FIG. 5B is a table depicting the relationship between the initial requested device number, the passed device number, and the responding device set, corresponding to the portion of the boot operation requesting to read the MBR, according to the embodiment of the present invention represented in FIG. 5A.

FIG. 5C is a table further depicting the correlation between the initial requested device number, the passed device number to which each individual device responds, and that corresponding physical device as referenced in FIG. 1, according to the embodiment of the present invention represented in FIG. 5A.

FIG. 6B is a table depicting the relationship between the initial requested device number, the passed device number, and the responding device set, corresponding to the portion of the boot operation requesting to read the MBR, according to the embodiment of the present invention represented in FIG. 6A.

FIG. 6C is a table further depicting the correlation between the initial requested device number, the passed device number to which each individual device responds, and that corresponding physical device as referenced in FIG. 1, according to the embodiment of the present invention represented in FIG. 6A.

DETAILED DESCRIPTION OF THE PREFERRED EMBODIMENTS

An invention is described for a method for selectively booting from a desired peripheral device. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

In one embodiment of the present invention, there is provided a method for booting a computer system from a SCSI device when an IDE device also is connected to the computer system. In this embodiment of the invention, the method includes the SCSI device, rather than the IDE device, responding to the boot read request.

Figure 1:
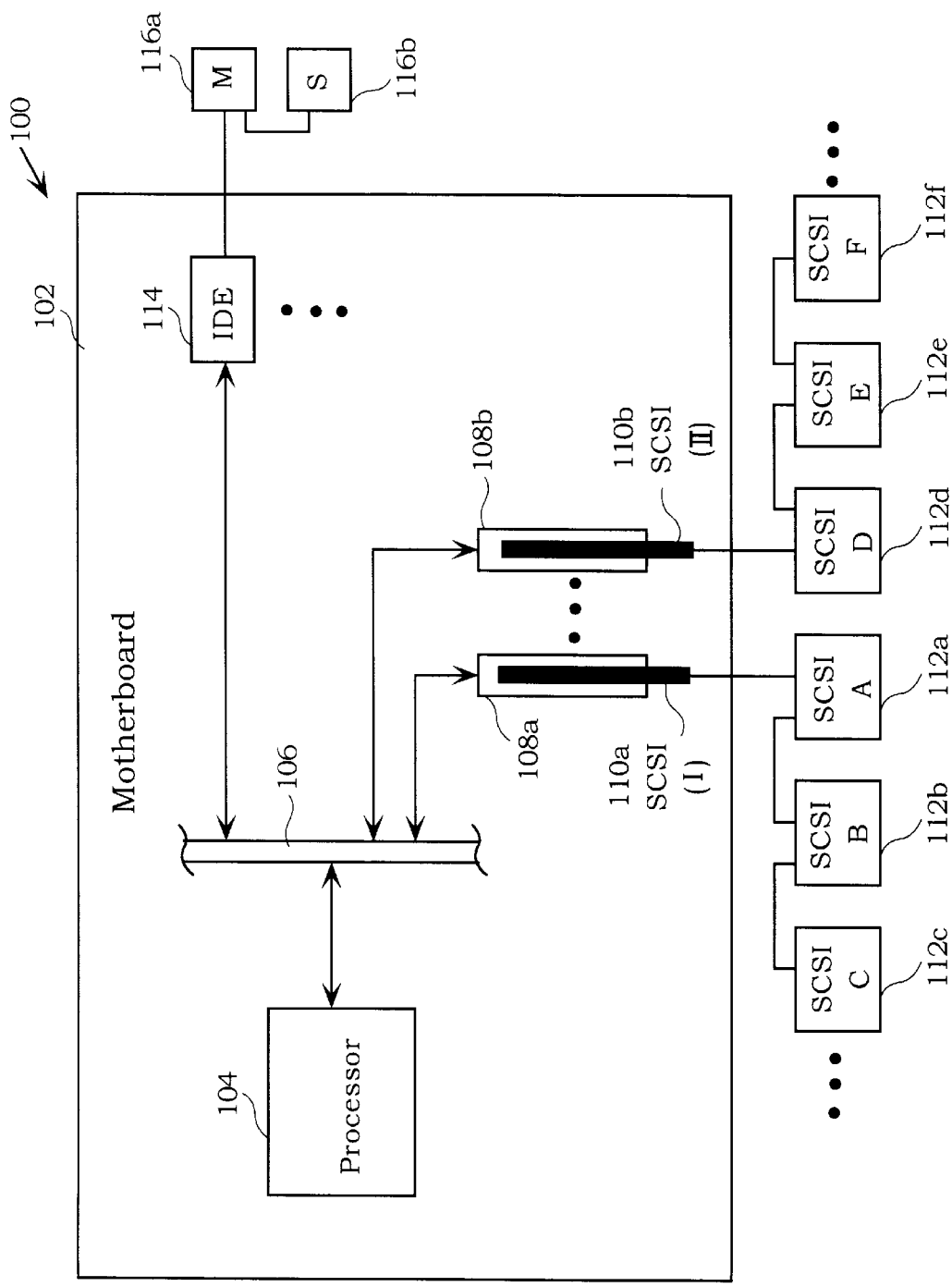
FIG. 1 is a schematic of a computer system motherboard.

The features and advantages of one embodiment of the present invention may be better understood by first referencing FIG. 1. FIG. 1 is a schematic of a computer system motherboard 102. On the motherboard is a processor 104 that is connected to a data interface 106. Data interface 106 may be any suitable data interface such as a system bus. The motherboard is also shown having an IDE controller 114 connected thereon. Although FIG. 1 depicts a single IDE controller 114 on the motherboard 102, any number of IDE controllers may be connected onto the motherboard 102, however, the exact number is constrained by the space limits of a given motherboard. The IDE controller 114, in turn, is connected to a master IDE device 116a, which is further connected to a slave IDE device 116b. For ease of discussion, the master and slave IDE devices will be collectively referred to below as "an IDE device set. " Of course, if the motherboard 102 contains other IDE controllers 114, the similar master/slave relationship will apply to the IDE devices that may be connected to those IDE controllers 114. Furthermore, the master and slave IDE devices 116a and 116b can be any type of IDE device, including a hard disk drive device.

Data interface 106 is further connected to PCI slots 108a and 108b. As is well known, PCI slots facilitate the connection of add-on devices (i.e., peripheral devices) to a standard computer system. Although only two PCI slots are depicted in FIG. 1, any number of PCI slots may be included on the motherboard 102 within the space constraints of the motherboard 102. PCI slots 108a and 108b are configured to receive SCSI adapter cards, which provide the necessary circuitry to interconnect add-on SCSI devices to the motherboard 102.

More specifically, FIG. 1 depicts PCI slot 108a receiving a first SCSI adapter card (SCSI-I) 110a, while PCI slot 108b receives a second SCSI adapter card (SCSI-II) 110b. SCSI-I adapter card 110a is, in turn, connected to a series of devices 112a–112c (i.e., SCSI A, SCSI B, SCSI C) which are external to the motherboard 102. Likewise, SCSI-II adapter card 110b is connected to add-on devices 112d–112f (i.e., SCSI D, SCSI E, SCSI F). To facilitate description of the present invention, the set of add-on devices connected to SCSI-I and SCSI-U adapter cards will be collectively referred to as "a SCSI-I device set" and "a SCSI-I device set," respectively. Although each SCSI adapter card 110a and 110b is shown connected to three SCSI devices, up to 7 or 15 devices typically can be connected to each SCSI adapter card, depending on the type of adapter.

Figure 2:
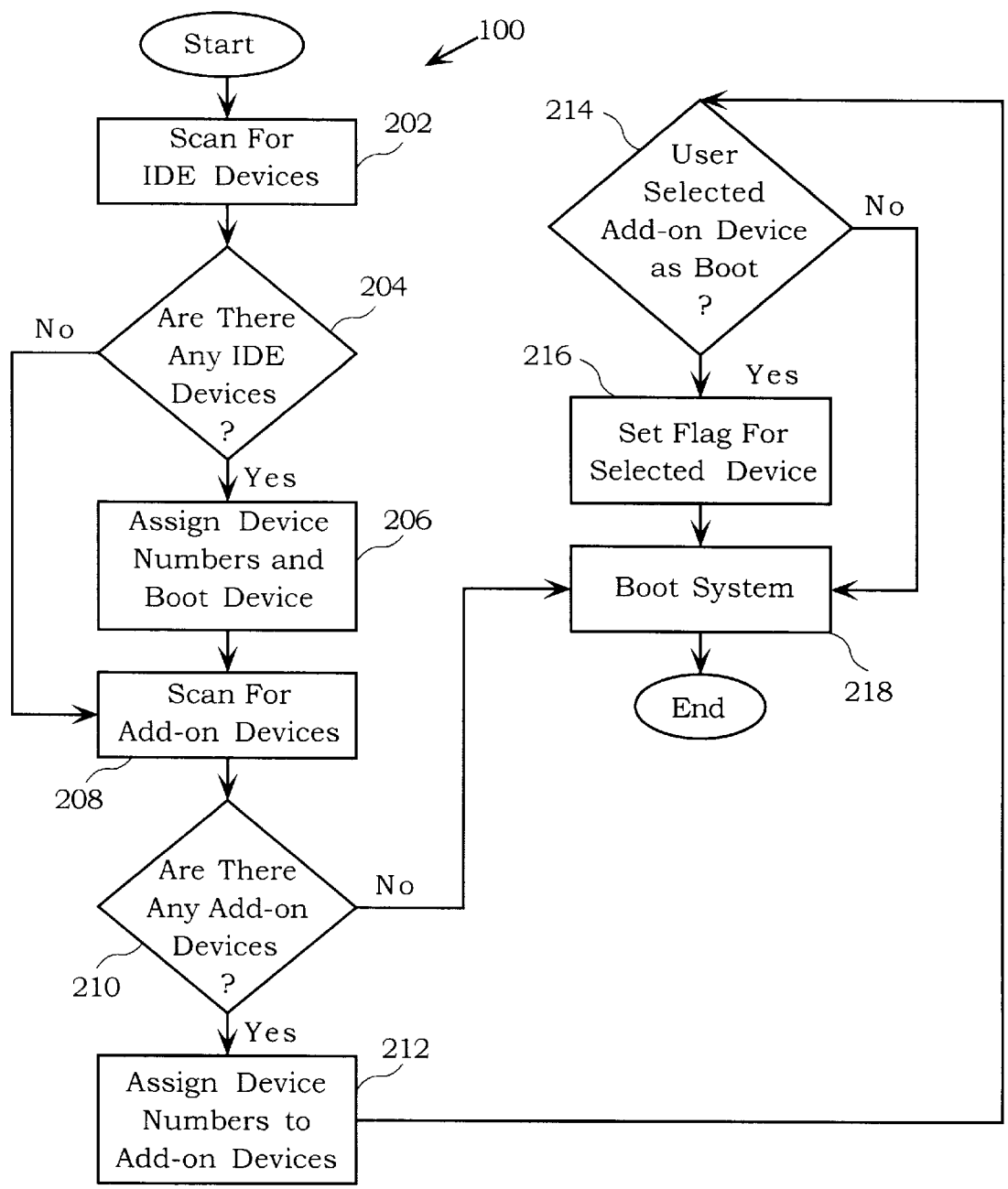
FIG. 2 is a flow chart depiction of an initialization process according to an embodiment of present invention.

One embodiment of the present invention is further understood with reference to FIG. 2, which shows a boot process 200. The process 200 begins at an operation 202 where an initial scan for IDE devices is performed. After scanning for IDE devices in operation 202, the process will proceed to a decision operation 204. In operation 204, it is determined whether any IDE devices were found in the scan of operation 202. If IDE devices were found, the process continues to an operation 206 where each IDE device is assigned a device number. As the device numbers are assigned to the found IDE devices, the first encountered IDE device is specifically assigned a device number that designates that IDE device to be "the boot device. " For example, process 200 operating in computer system 100 of FIG. 1 would encounter master IDE device 116a and slave IDE device 116b. Further, the two devices would be assigned device numbers 80h and 81h, with "80h" indicating the master IDE device 116a is the boot device. As is well known, device numbers are typically represented in hexadecimal form, which is represented by the "h" following the numbers 80 and 81. For ease of description, all subsequent references to device numbers will not include the letter "h", but it should be understood that those device numbers are hexadecimal representations.

After all IDE devices have been assigned device numbers or, alternatively, no IDE devices are found, the process continues to an operation 208 where the system scans for any add-on devices that may be connected to the system. Once the scan is complete, the process will move to an operation 210 where a determination is made as to whether any add-on devices were found in step 208. If no add-on devices are found, the process continues to an operation 218 where the system is booted. The booting operation will be further described with reference to FIG. 4 below. On the other hand, if any add-on devices are found during the scan of operation 208, each device is assigned a unique device number in an operation 212. For example, in the computer system of FIG. 1, process 200 would encounter SCSI add-on devices SCSI A–F and would assign to them device numbers 82–87, respectively. As each device is found in operations 204 and 210, an INT13 chain of all the devices found is formed. The formation of the INT13 chain will be described in greater detail below with reference to FIG. 3.

After all add-on devices have been assigned device numbers in operation 212, the process will proceed to an operation 214 where it is determined whether the user has selected one of the found add-on devices to be the new boot device. If the user has not selected any of the add-on devices to be the boot device, the process will continue to the operation 218 where the system is booted from the IDE device first identified as the boot device in operation 206, as will be described in more detail below with reference to FIG. 4.

On the other hand, if it is determined that the user has selected one of the add-on devices as the boot device in operation 214, the process will continue to an operation 216 where a flag is set for that selected device. Using the flag set in operation 216, the system will boot using the user-selected add-on device in operation 218. Afterwards, the system will proceed with well known start-up operations following the booting process.

Figure 3:
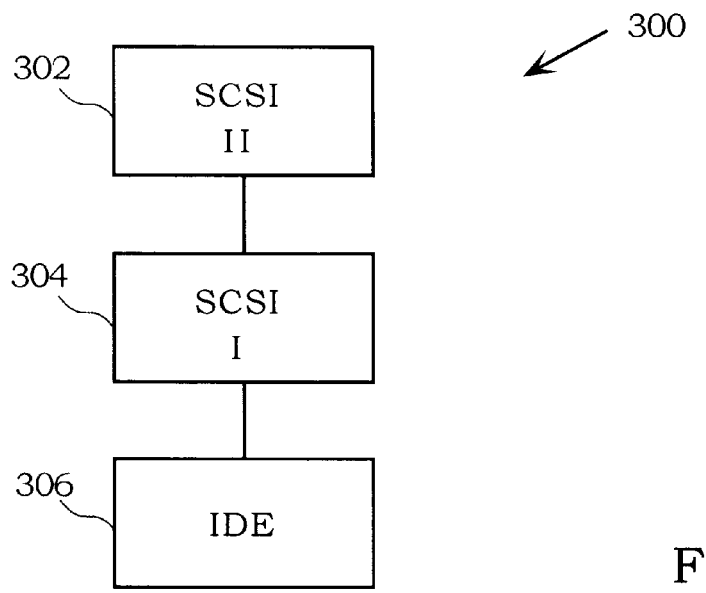
FIG. 3 is a schematic of an INT13 chain formed during the process depicted in FIG. 2 with the computer system of FIG. 1, in accordance with an embodiment of the present invention.

As mentioned above, as IDE and SCSI devices are encountered and assigned device numbers in operations 206 and 212 of FIG. 2, these devices are arranged into an INT13 chain. In this embodiment, these chains arrange the encountered devices in reverse order of when they were encountered. Thus, the last encountered device is listed first and the first encountered device is listed last. An example of such an INT13 chain is depicted in FIG. 3. The INT13 chain of FIG. 3 corresponds to the process 200 that was performed with the computer system of FIG. 1. Accordingly, SCSI-II device set 302 is listed first in INT13 chain 300, followed by SCSI-I device set 304. The SCSI devices are listed first because in operation 212 of process 200, the assigning of device numbers to the SCSI devices occurs after the assigning of device numbers to the IDE devices in operation 206. Thus, INT13 chain 300 ends with IDE device set 306.

The INT13 chain is used in the performance of various operations of the computer system. For example, when an operation includes a read or write request, that request is sequentially made to each device in the INT13 chain until one device responds to the request. The read or write request includes the device number of the device containing the medium to which or from which the operation is requesting to write or read. Accordingly, a request to read from the IDE device set 306 would first be directed to SCSI-II device set 302. Because the operation is directed at IDE device set 306, SCSI-II device set 302 will not respond to the request, the request being passed to SCSI-I device set 304. Likewise, the read request would be passed from SCSI-I device set 304 to IDE device set 306, where the read is performed.

Boot operation 218 of process 200 shown in FIG. 2, is further described with reference to FIG. 4. From either operation 210 or 216 of FIG. 2, the computer system initiates a request to read the master boot record (MBR) from device 80 in an operation 402. As is known in the art, an MBR includes the algorithms which, when executed, ready a computer system for normal operation. This read request identifies the MBR by indicating, or referencing, the device which contains the medium on which the MBR is located. If initiated from operation 210, the read request references the first found IDE device, while if from operation 216, the user selected add-on device is referenced. With this reference, the read request accesses the INT13 chain of FIG. 3, which will be further described below with reference to FIGS. 5A–C. In operation 404 the MBR is read, after which well known algorithms within the MBR are executed in operation 406.

Figure 4:
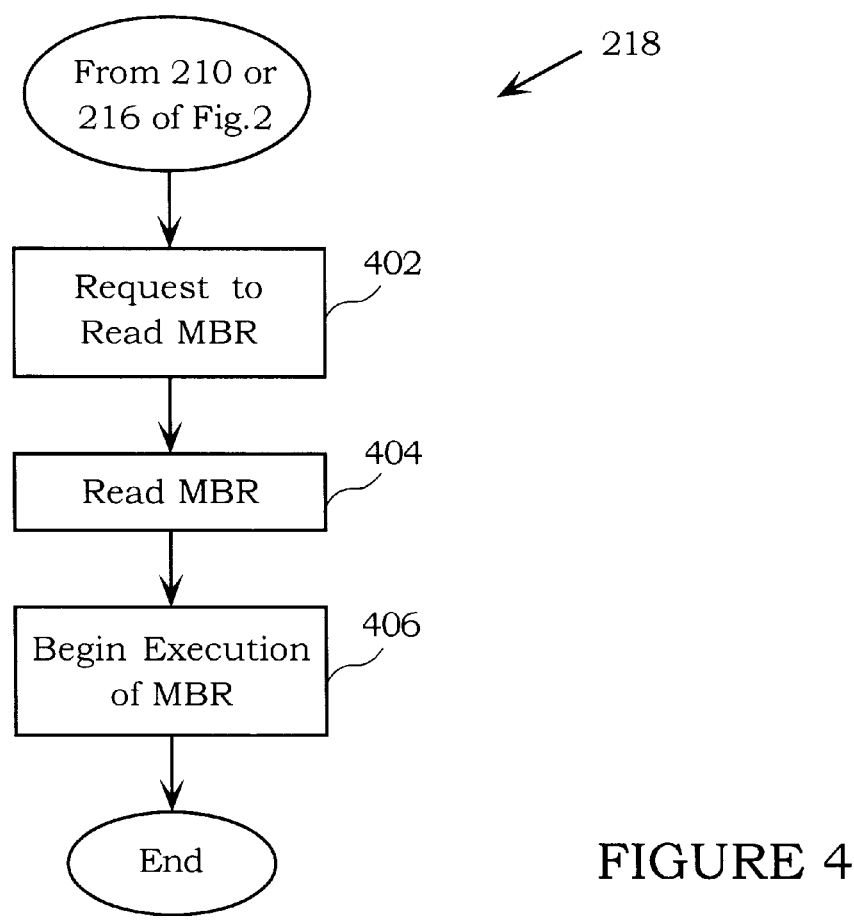
FIG. 4 is a flow chart representing the boot operation portion of the process depicted in FIG. 2.
Figure 5A:
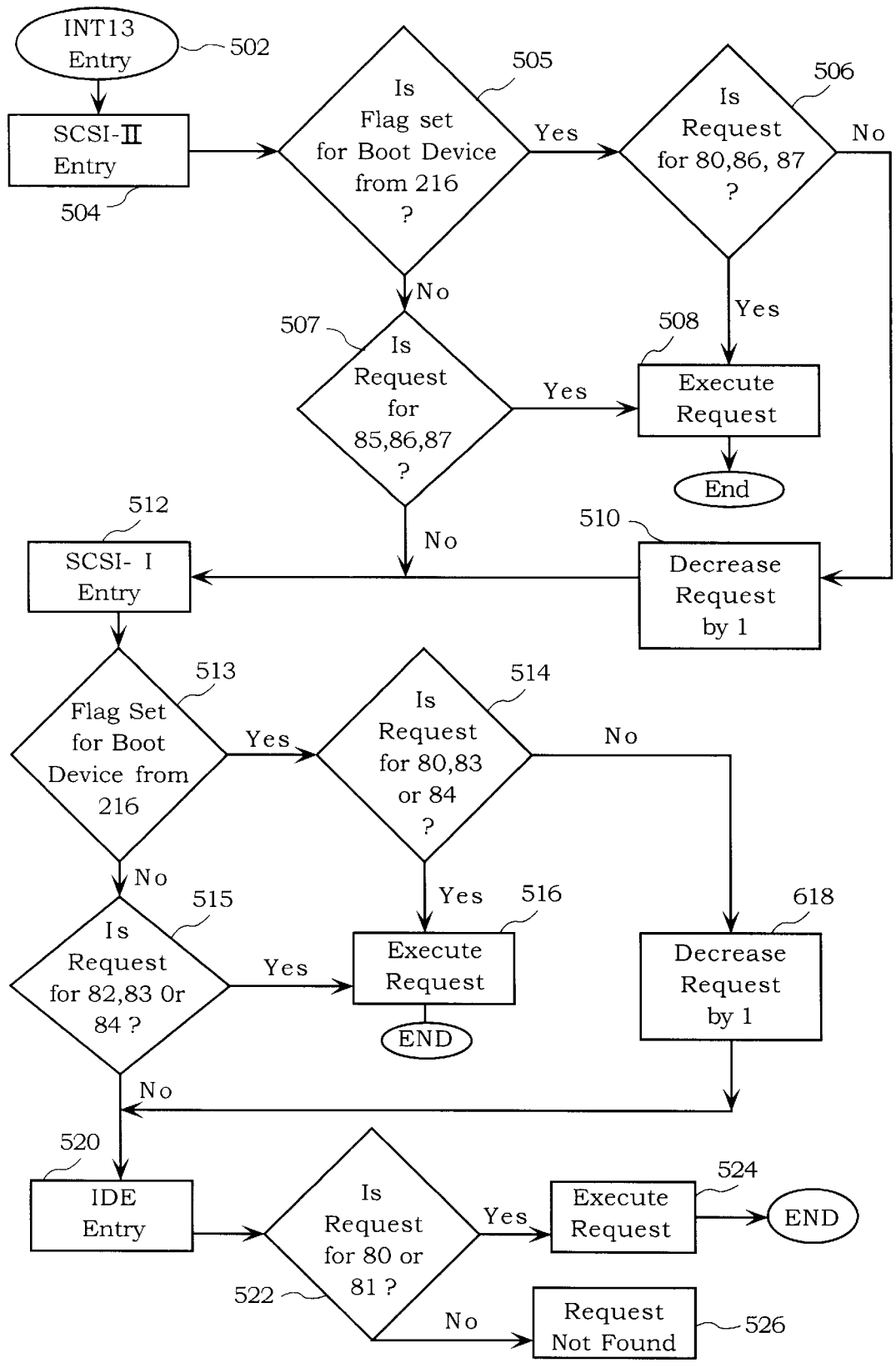
FIG. 5A depicts the portion of the boot operation depicted in FIG. 4, requesting to read the MBR in accordance with one embodiment of the present invention, for the case where the user has identified device SCSI D of FIG. 1 as the boot device.

The request to read the MBR operation 402 of operation 218 in FIG. 4 can be better understood with reference to FIG. 5A. FIG. 5A depicts a process in accordance with one embodiment of the present invention, in the case where the user has identified device SCSI D as the boot device. The read request begins with entry into the INT13 chain of FIG. 3 in an operation 502. Because, as shown in FIG. 3, SCSI-II device set 302 is first in the INT13 chain, the read request is first made to SCSI-II device set 302 in an operation 504. The process then continues to a decision operation 505 which determines whether the boot device flag was set in operation 216 of FIG. 2. If the flag has not been set, a decision operation 507 is then performed to determine whether the read request is directed at device number 85, 86 or 87. If it is, the request is executed in operation 508 by the appropriate device of the SCSI-II device set, and otherwise the process continues with entry to the SCSI-I device set in operation 512.

If in operation 505 it is determined that the flag has been set, the process will then proceed to a decision operation 506 where it is determined whether the read request is for device number 80, 86 or 87. As discussed above, a request for device number 80, would be a request for the boot device initially identified as the IDE device in operation 206 of Process 200. Thus, for the case depicted here, where the user has identified SCSI D to be the boot device, a request for device 80 would be executed in operation 508 by the first device of the SCSI-II device set 302. Further, the second and third devices in the SCSI-II device set 302 will respond, as normal, to requests for devices 86 and 87 in operation 508. If, in operation 506, it is determined that the request is not for device 80, 86 or 87, the device number referenced by the request is decreased by one in an operation 510. The request now continues down the INT13 chain to the SCSI-I device set 304 in an operation 512.

The process then continues to a decision operation 513 which determines whether the boot device flag was set in operation 216 of FIG. 2. If the flag has not been set, a decision operation 515 is then performed to determine whether the read request is directed at device number 82, 83 or 84. If it is, the request is executed in operation 516 by the appropriate device of the SCSI-I device set, and otherwise the process continues with entry to the IDE device set in operation 520.

On the other hand, if it is determined, in operation 513, that the flag was set, in a decision operation 514 it is determined whether the request is for device number 80, 83 or 84. Due to the decrease of the request number in operation 510, a request in operation 514 for device 80, 83, or 84 is representative of an initial request for device numbers 81, 84 or 85. Alternatively, for example in the case where it is desired to boot from the first device of SCSI-I device set, SCSI-II device set can be physically disabled (e.g., disconnected from the computer system), in which case operations 504 through 510 would be skipped, and the process would begin at operation 512. Accordingly, to pass a request of 80 to the evaluation operation 514, an initial request of 80, not 81, would need to be made. The correlation between the initially requested device number in operation 502, and the request passed to a particular point in the INT13 chain, will be further discussed below with reference to FIGS. 5B and 5C. If the request in operation 514 is for device 80, 83 or 84, the request is executed in an operation 516. Otherwise, the device number referenced in the request is once again decreased by one in an operation 518 and passed to the IDE device set 306 in operation 520. In a decision operation 522, it is determined whether the request is for device number 80 or 81 (here corresponding to a request initially referencing 82 or 83). If the request entering an IDE entry of the INT13 chain in operation 520 is determined not to be 80 or 81, the operation ends, returning a "request not found" message in an operation 526. On the other hand, if the request is for device 80 or 81, the request is executed in an operation 524.

FIG. 5B depicts the relationship between (1) the device number of the initial request entering into the INT13 chain in operation 502, (2) the request passed to the particular point within INT13 chain where the request is finally executed, and (3) the device which responds to that request. For example, an initial request referencing device number 80 is passed to SCSI-II device set 302 in operation 504 in a non-decreased state (i.e., referencing device number 80). In the present case, where the user has identified a device in SCSI-II device set 302 as the boot device, the SCSI-II device set 302 responds to the read request referencing device number 80.

On the other hand, an initial request referencing device number 81, will not be responded to by the SCSI-II device set, and thus the reference device number 81 will be decreased by one to 80 in operation 510. Therefore, the request passed to SCSI-I device set 304 in operation 512 will reference device number 80. Accordingly, in decision operation 514, it will be determined that the request is for a device in the SCSI-I device set 304 and the request will be executed by a SCSI-I device. In another example, a read request initially referencing device number 82 will not be responded to by either SCSI-II device set 302 or SCSI-I device set 304, thus leading to two decreases of the request number. Accordingly, the device number referenced in the initial request will be decreased to 81, and then to device number 80, which is passed to the IDE device set 306. The now decreased reference number 80 in the request is now recognized and an IDE device executes the request. Read requests referencing other device numbers are similarly passed and responded to by the appropriate devices according to the process of operation 402.

FIG. 5C further describes the correlation between the device number referenced in the initial request, the passed reference number to which each device responds, and that corresponding physical device of FIG. 1. Thus, in the case where a user has identified SCSI D to be the boot device, an initial request for device 80 is responded to by SCSI D of the SCSI-II device set 302. It can be seen from FIG. 5C that for each initial requested device number there is a unique physical device which responds to that initial request. Accordingly, the result of one embodiment of the present invention is that any request referencing device 80, including a boot read request, will be executed using SCSI D, while still providing access to all other devices connected to the computer system. Of course, if the user did not select to boot from an add-on device in operation 214 of FIG. 2, then booting will commence from an IDE device.

Figure 6A:
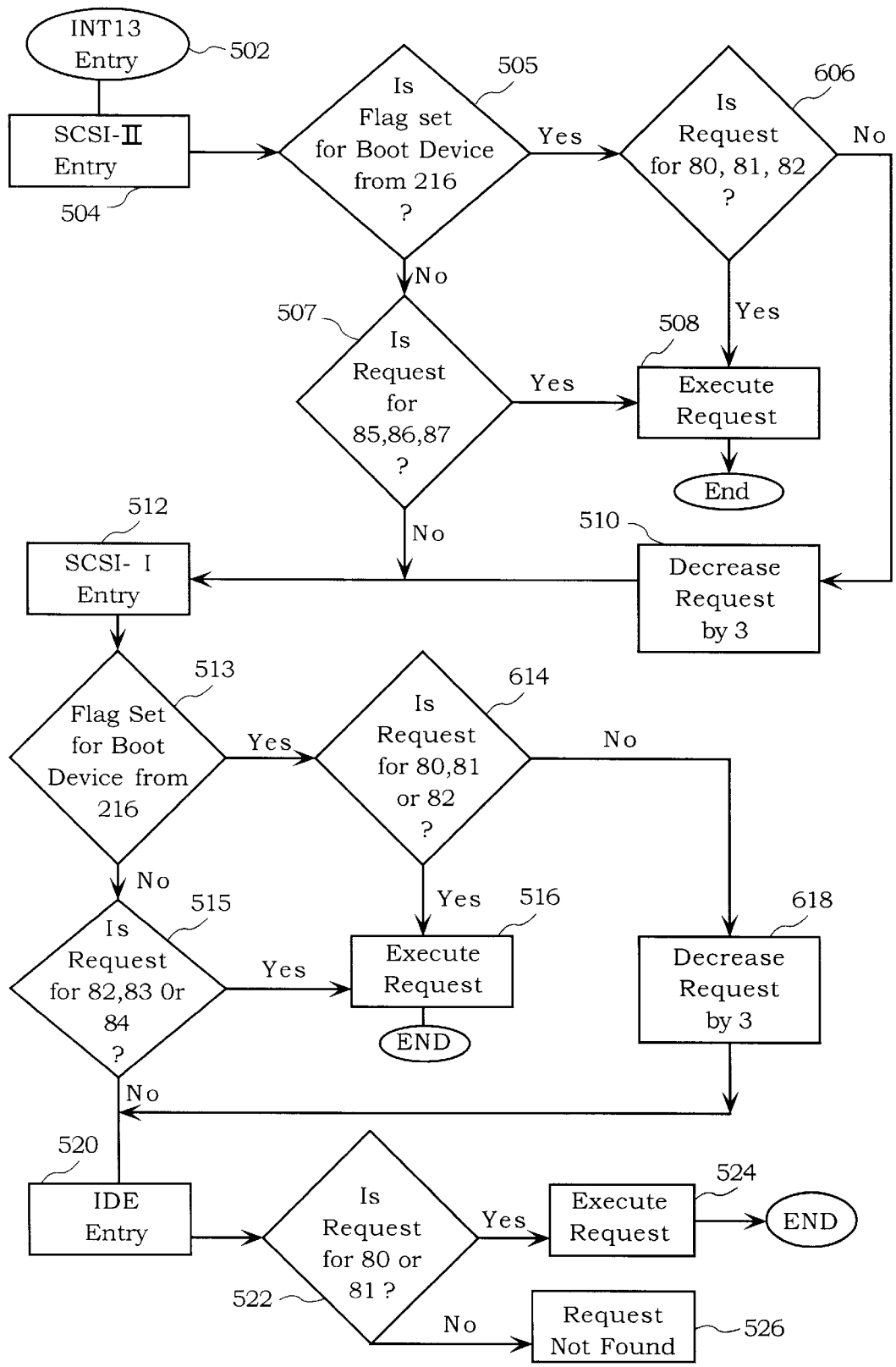
FIG. 6A depicts the portion of the boot operation depicted in FIG. 4, requesting to read the MBR in accordance with another embodiment of the present invention, for the case where the user has identified device SCSI D of FIG. 1 as the boot device.

Another embodiment of the present invention is better understood with reference to FIGS. 6A through 6C. While FIG. 5A describes process 402 which incorporates the decrease of the referenced device number by one when a request is passed along each INT13 chain entry, FIG. 6A depicts a similar process 402' which incorporates a decrease of the referenced device by three. Thus, process 402' differs in operation 610 and 618 with the decrease of three, as well as in the determination operations 606 and 614, which identify the referenced device number to which the devices respond.

In this embodiment, an initial request referencing device number 80 will pass to SCSI-II device set 302 in operation 504, will be recognized in the determination operation 606, and executed by the first SCSI device (SCSI D) in the SCSI-II device set 302 in operation 508. However, a request referencing device number 86 will pass through SCSI-II device set 302 and the referenced device number decreased by three in an operation 610. Thus, the referenced device number passed to the SCSI-I device set 304, in operation 512 will be 83. Device number 83 will not be recognized in an operation 614 and the process will continue to an operation 618 where the device number referenced by the request is once again decreased by an additional three. Accordingly, the referenced device number passed to the IDE device set 306 in operation 520 will be 80 and therefore will be identified in an operation 522, resulting in the execution of the request by the first IDE device in operation 524.

The operation of the process 402' of this embodiment can further be understood with reference to FIGS. 6B and 6C. In FIG. 6B, it should be readily apparent that the initial request for device 80, 81 or 82 is passed unchanged as requests for devices 80, 81 or 82. With operation 610, initial requests referencing device numbers 83, 84 or 85 are decreased and passed as requests for devices 80, 81 or 82. Finally, initial requests for devices 86 or 87 are twice decreased by three, first in operation 610, then in operation 618, to result in passed requests for devices 80 and 81. Again, FIG. 6C exemplifies that with process 402', each initial request referencing a unique device number is responded to by a single unique device, while the first device of the SCSI-II device set 302 responds to computer system requests referencing device 80.

Although the above described embodiments incorporate processes which decrement the referenced device number by one or three, other embodiments may be optimized to decrement by other amounts. Further, while the preferred embodiments of the present invention have been described with reference to the computer system shown in FIG. 1, the present invention works equally as well with computer systems having more or fewer IDE or SCSI devices than those considered in the above examples.

Figure 7A:
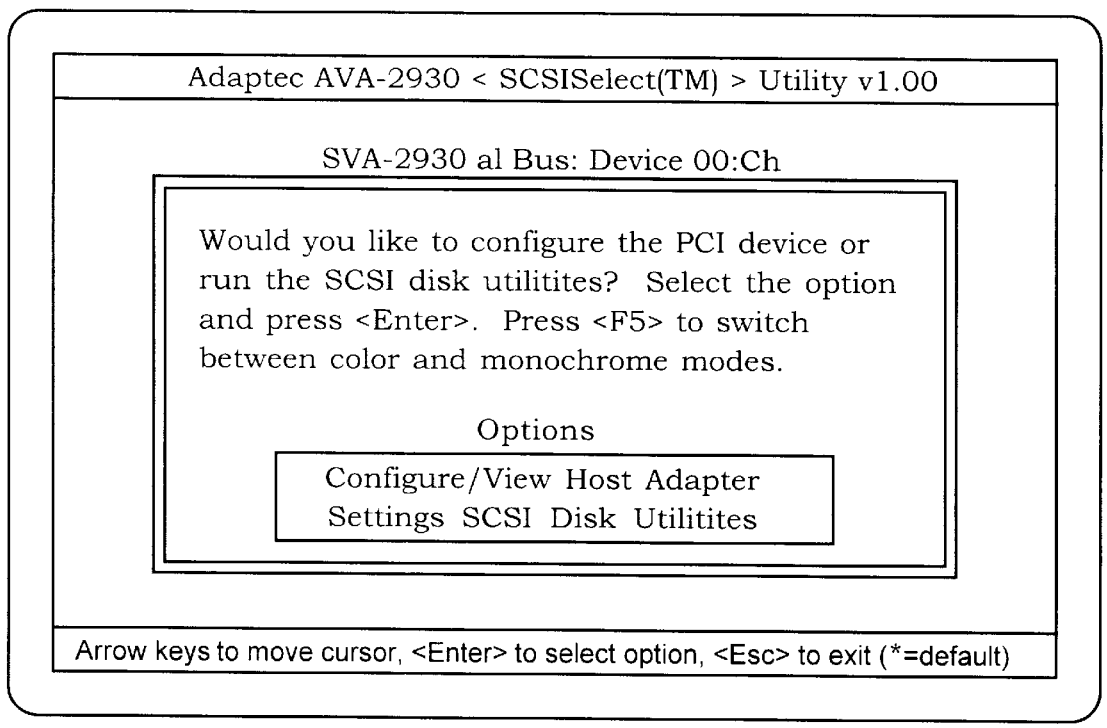
FIGS. 7A, 7B and 7D depict a representative user interface according to an embodiment of the present invention.
Figure 7B:
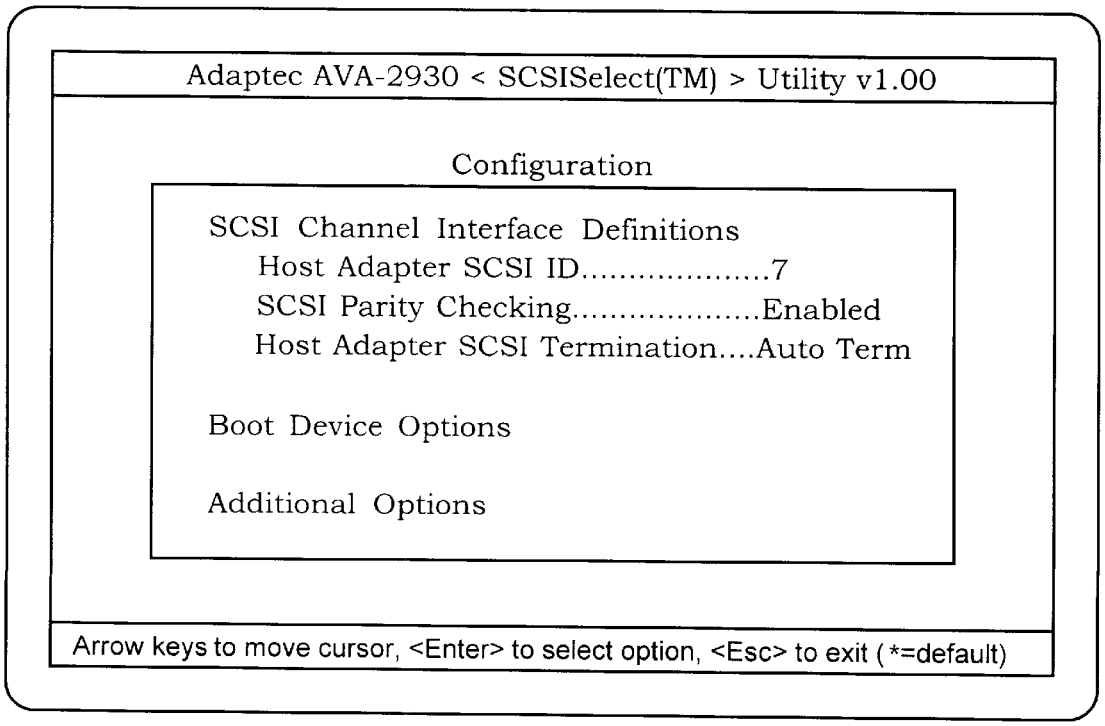

Another aspect of the present invention involves the interface between the user and the computer system utilized for facilitating the user-selection of a boot device of operation 214. One embodiment of the present invention includes an interface incorporating direction and command screens with correlated response functions. FIGS. 7A and 7B depict screen shots of a user interface in accordance with one embodiment of the present invention. The screen shot of FIG. 7A is preferably displayed to the user during a well known initialization process of the computer system. To select a boot device, the user is directed to select the "Configure/View Host Adapter Settings" and press <Enter>. Upon doing so, the user is shown the screen depicted in FIG. 7B which gives the option of "Soot Device Options." Upon selection of this option, the user is shown the screen in FIG. 7D. On this screen, the user may select a device from which the system will boot, by selecting one of the listed devices. With reference to FIG. 2, these screens are exhibited before operation 214 in which the determination is made as to whether the user has selected an add-on device as the boot device.

Figure 7C:
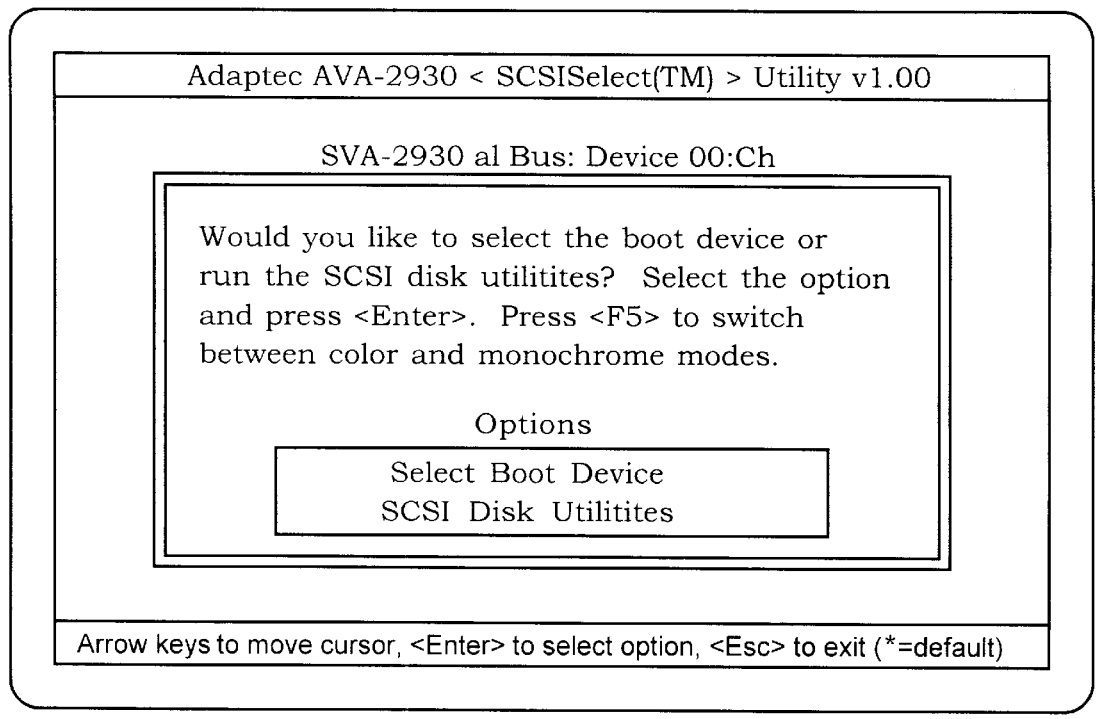
FIG. 7C, in conjunction with FIG. 7D, depicts a representative user interface according to another embodiment of the present invention.
Figure 7D:
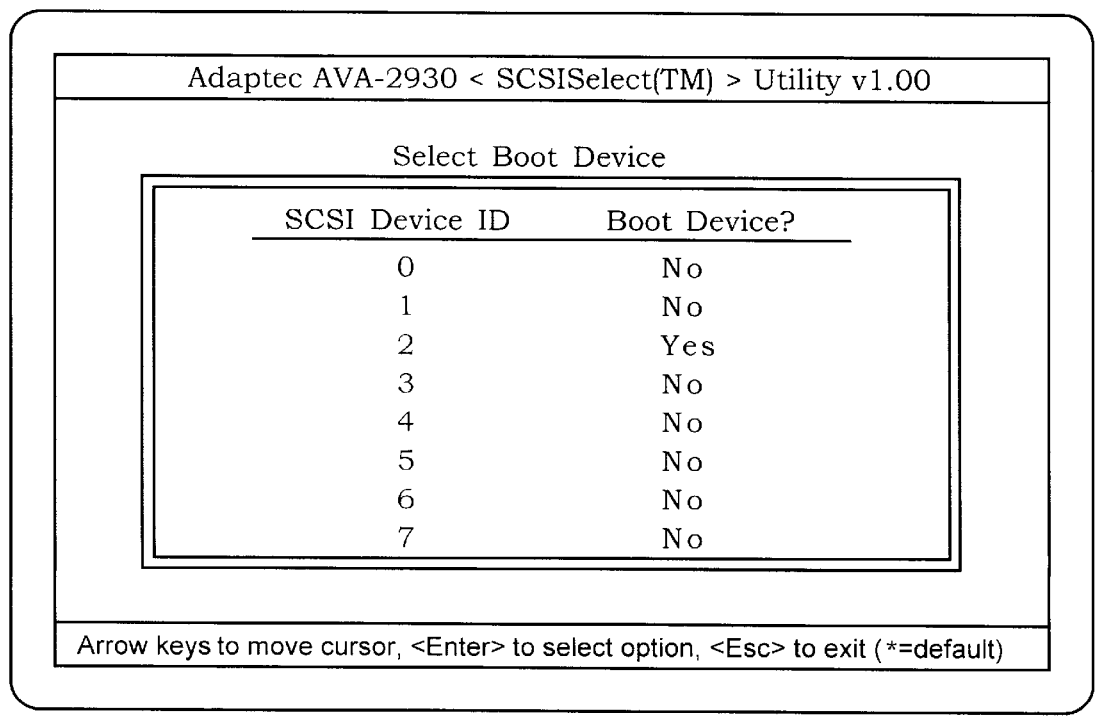

An alternative embodiment of this aspect of the present invention incorporates display of the screen depicted in FIG. 7C. After selection of the "Select Boot Device" option from this screen, the screen of FIG. 7D is displayed, where the user can select the boot device as in the above described embodiment. While the above described interfaces incorporate direction and command screens with correlated response functions, the interface of the present invention could, for example, alternatively include a graphical user interface (GUI) that allows a user to use a mouse, a touch screen, or any other type of mechanism for inputting commands.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for booting a computer system having a plurality of devices including an IDE device and a SCSI device, comprising:

initializing the computer system, the initializing causing an automatic identification of the IDE device as a boot device; the initializing including, searching for the IDE device before the automatic identification of the IDE device as the boot device; and searching for the SCSI device before the SCSI device is specified to be the boot device;

specifying the SCSI device to be the boot device so that the computer system boots from the SCSI device and not from the IDE device and the specifying is in part a function of an input from a user.

2. A method for booting a computer system as recited in claim 1, further comprising the act of:

building a device chain of the found IDE and SCSI devices in sequential order such that a first device is located in the device chain before a second device that was found before the first device.

3. A method for booting a computer system as recited in claim 2, wherein the device chain is an INT13 chain.

4. A method for booting a computer system as recited in claim 2, further comprising the acts of:

requesting a response from a device located in the device chain subsequent to the specified SCSI device, the requesting incorporating a reference to the device located in the device chain subsequent to the specified SCSI device;

determining whether the request is directed to the specified SCSI device;

modifying the reference to the device located in the device chain subsequent to the specified SCSI device when it is determined that the request is not directed at the specified SCSI device;

determining whether the request is directed at the device located in the device chain subsequent to the specified SCSI device by evaluating the modified reference; and responding to the request with the device located in the device chain subsequent to the specified SCSI device.

5. A method for booting a computer system as recited in claim 4, wherein the requesting a response is a read request and the responding to the request includes a reading of the device located in the device chain subsequent to the specified SCSI device.

6. A method for booting a computer system as recited in claim 4, wherein the requesting a response is a write request and the responding to the request includes a writing to the device located in the device chain subsequent to the specified SCSI device.

7. A method for booting a computer system as recited in claim 4, wherein the reference is a numerical reference and the modification is a decrement by one.

8. A method for booting a computer system as recited in claim 4, wherein the reference is a numerical reference and the modification is a decrement by three.

9. A method for booting a computer system having a plurality of devices including an IDE device and a SCSI device, the method comprising the acts of:

initializing the computer system, the initializing causing an automatic identification of the IDE device as a boot device; and specifying the SCSI device to be the boot device so that the computer system boots from the SCSI device and not from the IDE device, the specifying is in part a function of an input from a user and the SCSI comprises a SCSI BIOS, such that the specifying is performed by the SCSI BIOS when the input from the user is a specific input.

10. A method for booting a computer system as recited in claim 1 further comprising the act of:

booting the computer system from the SCSI device wherein the booting comprises the acts of:
    requesting to read a sector of the boot device; and
    responding to the requesting to read with the SCSI device such that a sector of the SCSI device is read.

11. A method for booting a computer system as recited in claim 10, further comprising:

building a device chain of the found IDE and SCSI devices in sequential order such that a first device is located in the device chain before a second device that was found before the first device; and wherein the request to read is sequentially directed to the devices of the device chain in the order of their location in the device chain, until a device responds to the request.

12. A method for booting a computer system as recited in claim 11, wherein the request to read is first directed to a device listed first in the device chain.

13. A method for booting a computer system as recited in claim 12, wherein the found SCSI device is located in the device chain before the found IDE device and the request to read is first directed to the SCSI device.

14. A method for booting a computer system, having a first device and a second device which, during initialization of the computer system, are each respectively automatically associated with a unique identification used in a computer generated request to indicate whether the first device or the second device is to respond to the computer generated request, the method comprising the act of:

modifying each unique identification that is associated with the first device and the second device of the computer system, such that the second device responds to the computer generated request for the first device, and the first device responds to the computer generated request for the second device, wherein the modifying is performed in response to an input by a user desiring to boot from the second device and the modifying being performed by a BIOS of the second device.

15. A method for booting a computer system as recited in claim 14, wherein the first device is an IDE device and the second device is a SCSI device.

16. A method for booting a computer system as recited in claim 15, wherein the computer generated request is a boot read request for the IDE device, such that the computer system boots from the SCSI device.

17. A method for booting a computer system as recited in claim 16, wherein the boot read request uses the unique identification associated with the first device and wherein the boot read request comprises the act of requesting to read a medium of a boot device.

18. A method for booting a computer system as recited in claim 17, wherein the unique identification associated with the first device is 80h.

19. A method for booting a computer system that is connected to an IDE device and a SCSI device, the method comprising the acts of:

searching for the IDE device;

searching for the SCSI device after the searching for the IDE device has been performed;

identifying the SCSI device as a boot device, the identifying of the SCSI device is commenced in part due to a user input; and booting from the identified SCSI device.

20. A method for booting a computer system as recited in claim 19, further comprising the act of:

building a device chain of the found IDE and SCSI devices in sequential order, such that the SCSI device is located in the device chain immediately before the IDE device that was found immediately before the SCSI device.

21. A method for booting a computer system as recited in claim 19, further comprising the act of:

associating an identifier with the IDE device when the IDE device is found by the searching, such that the IDE device is identified as the boot device before searching for the SCSI device.

22. A method for booting a computer system as recited in claim 21, further comprising the act of:

requesting a read of a first sector of the boot device, the request identifying the boot device by using the identifier associated with the IDE device.

23. A method for booting a computer system as recited in claim 22, wherein the identifier associated with the IDE device is 80h.

24. A method for booting a computer system as recited in claim 22, wherein when the request to read is performed, the SCSI device responds such that the first sector of the SCSI device is read.

25. A method for booting and subsequently operating a computer system that is connected to a peripheral device, the method comprising the acts of:

searching for IDE devices;

associating identifications with each found IDE device, including associating the boot drive identification with the first encountered IDE device;

building a device chain with found IDE devices, such that the first encountered device is the last device of the device chain;

searching for SCSI devices;

associating identifications with each found SCSI device;

adding to the device chain the found SCSI devices, such that the last encountered device is the first device of the device chain;

identifying one of the SCSI devices as the boot device if a user input is received;

requesting to read the first sector of the drive associated with the boot drive identification;

responding to the read request with the SCSI device that was identified as the boot device by the user input; and requesting an operation for a device other than the boot device, such that the requesting of an operation includes identifying the device by an identification other than the boot device identification.

26. A method for booting and subsequently operating a computer system that is connected to a peripheral device as recited in claim 25, wherein the devices are located in the device chain in reverse order of when the devices were found, such that all found SCSI devices are located on the device chain before all found IDE devices.

\* \* \* \* \*